United States Patent
Bard

[11] Patent Number: 4,918,710
[45] Date of Patent: Apr. 17, 1990

[54] FABRICATION PROCEDURE FOR A CROSS-BRACING GRID FOR A FUEL ASSEMBLY OF A NUCLEAR REACTION

[75] Inventor: Josette Bard, Miribel, France

[73] Assignees: Framatome, Courbevoie; Cogema, Velizy Villacoublay, both of France

[21] Appl. No.: 235,593

[22] Filed: Aug. 24, 1988

[30] Foreign Application Priority Data

Aug. 24, 1987 [FR] France .................... 87 11861

[51] Int. Cl.$^4$ .............................................. C22F 1/18
[52] U.S. Cl. ............................... 376/438; 148/11.5 F
[58] Field of Search ............ 376/438, 457, 462, 900; 29/723; 420/422; 148/11.5 F, 421

[56] References Cited

U.S. PATENT DOCUMENTS

| | | | |
|---|---|---|---|
| 4,360,389 | 11/1982 | Urquhart | 148/11.5 F |
| 4,584,030 | 4/1986 | McDonald | 148/11.5 F |
| 4,717,427 | 1/1988 | Morel | 148/11.5 F |

FOREIGN PATENT DOCUMENTS

| | | |
|---|---|---|
| 0192499 | 8/1986 | European Pat. Off. . |
| 1241998 | 6/1967 | Fed. Rep. of Germany . |
| 62-180027 | 8/1987 | Japan . |
| 997761 | 7/1965 | United Kingdom . |

*Primary Examiner*—Donald P. Walsh
*Attorney, Agent, or Firm*—Pollock, Vande Sande & Priddy

[57] ABSTRACT

A zirconium alloy sheet containing 2 to 3% of niobium is cooled at a controlled and moderate rate to the $\alpha+\beta$ state. Plates (2, 2') are cut from the cooled sheet and cold-formed. The grid (1) is assembled from the plates (2, 2') which are welded together and the completed grid is then returned to the $\alpha$ phase by heating at a temperature of between 400° and 550° C. for a period of ten to thirty hours.

8 Claims, 1 Drawing Sheet

4,918,710

FABRICATION PROCEDURE FOR A CROSS-BRACING GRID FOR A FUEL ASSEMBLY OF A NUCLEAR REACTION

FIELD OF THE INVENTION

The invention concerns a process for manufacturing a cross-bracing (or support-column) grid consisting of zirconium alloy sheet metal plates for a fuel assembly of a nuclear reactor which is cooled by water under pressure.

BACKGROUND OF THE INVENTION

The fuel asemblies of water-cooled nuclear reactors are generally constituted by a bundle (or cluster) of so-called fuel rods which consist of tubes containing pellets of nuclear fuel and are arranged parallel to each other and in such a way as to form a regular lattice (or network) in the assembly's plane of cross-section.

The fuel rods are held in place transversely by cross-bracing grids which are distributed along the length of the assembly, each of the grids reproducing the lattice in which the fuel rods are located.

The grids are constituted by plates cut into a ribbon and shaped to constitute bearing places for the fuel rods, such as bosses formed by embossing the metal of the plate. The plates are then welded together to form the grid lattice.

In the case of pressurized water nuclear reactors, the cross-bracing grids which hold the fuel rods in place are made in conventional manner from a precipitation-hardened nickel base alloy. This material possesses good mechanical properties which remain at a satisfactory level during the use of the fuel assemblies in the core of the reactor.

With the objective of improving the performance of nuclear fuel assemblies, the tendency nowadays is to replace the nickel alloy cross-bracing grids by cross-bracing grids consisting of plates of a zirconium-base alloy, the neutron capture cross-section of which is very much smaller. In fact, the fuel assemblies presently manufactured and used in pressurized water nuclear reactors incorporate, for the most part, grids made of a zirconium alloy, designated by the name zircaloy 4, which, in addition to zirconium, contains essentially tin, iron and chromium.

The manufacturing sequence of the cross-bracing grid, namely, the cutting, shaping and assembling by welding of the plates, is carried out on the material while in its final metallurgical state, i.e., on an alloy which has been heat treated to obtain the desired mechanical and chemical characteristics.

In order to improve the performance of the nuclear fuel, the present-day tendency is to increase the requirements for the as far as the characteristics are concerned, of the structural elements such as, for example, the cross-bracing grids.

In the main, these requirements refer to obtaining low resistance to the flow of the cooling water as it passes through the assembly, increased mechanical strength, and minimal alteration in the properties of the grid in the operating environment, namely, in the core of the nuclear reactor.

Obtaining low resistance to flow assumes the use of thin plates and complex geometry. The material which constitutes the plates of the grid should, in particular, be highly amenable to stamping.

The material should also be resistant to oxidation and to hydrogenization, and should undergo only very small dimensional changes in the core of the operating reactor.

Niobium-containing zirconium alloys are knonw, the properties of which, in particular their resistance to corrosion and to hydrogenization, can be adjusted by controlling their metallurgical state.

In certain metallurgical states, the said alloys can easily be cold-formed.

Finally, in whatever metallurgical state, the alloys containing at least 2% niobium have a mechanical resistance higher or much higher than that of Zircaloy 4 and a growth under irradiation which is weaker or much weaker.

However, to date, the said alloys have not been developed for components of fuel assemblies in pressurized water reactors (PWR), their resistance to generalized corrosion being considered as insufficiently compared to the corresponding resistance of zircaloy 4 at the operating temperature of a PWR (300°–330° C.). On the contrary, the resistance to corrosion of zirconium base alloys containing niobium at the operating temperatures of boiling water reactors in better than the corresponding resistance of zircaloy 4. Thus, these alloys are commonly used in boiling water reactors.

When it is desired to improve the performance of the grids and their useful life the utilization of these alloys is attractive for they have a slower kinetic of hydrogenization than zircaloy 4 in the operating environment of a PWR, as far as the other required properties can be optimized, i.e.:

the capacity for forming the semi-finished product (sheet metal), the corrosion rate which should be as low as possible.

Further, the mechanical resistance and the growth under irradiation can also be optimized, thus increasing the advantages of the niobium containing alloys over zircaloy.

In German Patent Application 3 730 168, it is recommended to use zirconium base alloys containing niobium and tin for manufacturing components for nuclear reactor fuel assemblies. The components such as cross-bracing grids consist of plates which are cold rolled, cut and formed after a rapid quench from a high temperature (generally a water-quench). The components are tempered after being assembled by welding.

SUMMARY OF THE INVENTION

Such alloys containing tin and rapidly quenched during a first phase cannot develop greatly improved properties, in particular where they are applied to components for PWRs. An object of the invention is to propose a process for the manufacture of a cross-bracing grid for a fuel assembly of a pressurized water nuclear reactor consisting of plates of a zirconium base alloy which contains 2 to 3% of niobium, the process consisting in cutting and cold forming a flat product of a zirconium alloy to form the lattice of the grid, the said process making it possible to obtain complex forms for the plates as well as mechanical strength and chemical resistance to the grid which are adapted to the conditions of use within the nuclear reactor. With this objective, the zirconium base alloy is tin-free, and, before the cold working operation for producing the plates, the flat product is cooled at a regulated and moderate rate, from a temperature at which the zirconium alloy is in the $\alpha+\beta$ form and, after the plates have been assembled, the grid is subjected, as a unit, to an α phase (aging), at a temperature between 400° and 550° C., for a period of ten to thirty hours.

BRIEF DESCRIPTION OF THE DRAWINGS

In order for the invention to be better understood, a description will now be given, by way of example and with reference to the appended drawings, of a way in which the invention is employed to manufacture a cross-bracing grid of a fuel assembly of a pressurized water nuclear reactor.

DESCRIPTION OF THE PREFERRED EMBODIMENT

Figure 1:
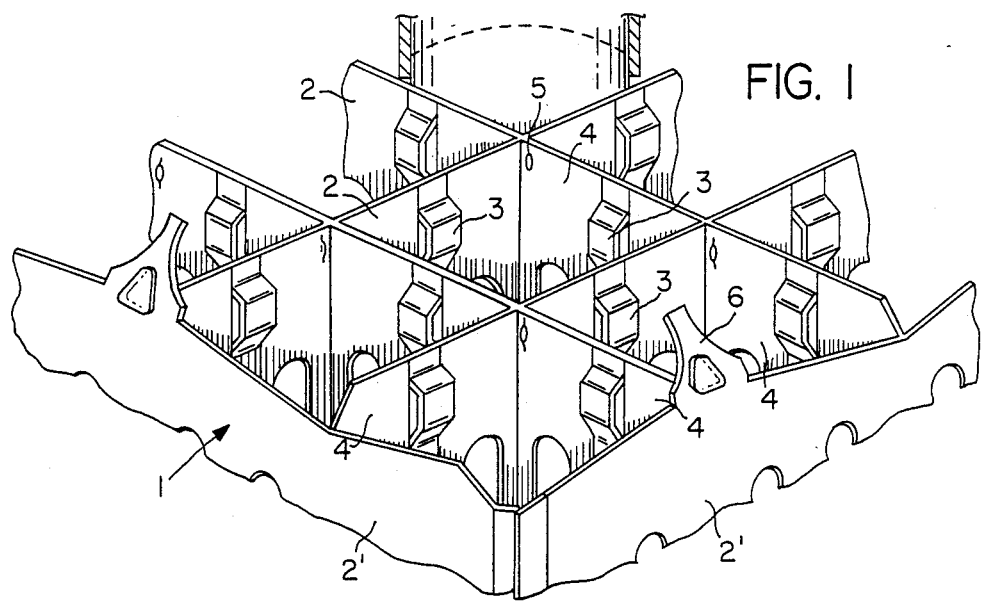
FIG. 1 is a perspective view of a cross-bracing grid for a fuel assembly of a pressurized water nuclear reactor.

FIG. 1 shows a cross-bracing grid 1 consisting of plates 2 which are cut and formed before the grid is assembled. The grid lattice consists of square meshes, the plates 2 together forming cells 4 in each of which can be introduced a fuel rod or a guide tube which is held in place transversely.

The plates 2 are assembled at the level of assembly slots whose position corresponds to the corners of the cells 4. The assembly of the plates constituting the grid is ensured by the weld beads 5 in the junction zones between the plates 2. The plates 2 are provided with bosses 3 which project inwards towards the interior of the cells 4 and which press against and hold in place the fuel rods, the said bosses being produced by cutting and embossing the metal constituting the plates prior to assembling.

The plates are likewise cut and bent over to form mixing fins 6 for the cooling water of the reactor which circulates in the corresponding assembly.

The plates 2 are made by cutting and then cold forming a ribbon of zirconium alloy.

The plates 2 constituting the internal cross-braces of the grid can be made from a ribbon whose thickness is of the order of 0.3 to 0.5 mm. The cross-braces 2' which form the exterior framework of the cross-bracing grid 1 have a somewhat greater thickness, of the order of 0.6 to 0.8 mm.

To employ the process according to the invention, use is made of a binary zirconium base alloy ribbon which contains niobium, the niobium content being of the order of 2.5% by weight.

More generally, the zirconium alloys used in applying the process according to the invention can contain 2 to 3% of niobium and, preferably, from 2.35 to 2.75% of niobium.

The said alloys also contain oxygen in the amount of 0.09 to 0.13% by weight, as well as very small amounts of other alloying elements or impurities. An example is given below of an alloy which is in accordance with the invention, the amounts of alloying elements being given in percent by weight:

| Niobium | oxygen | iron | carbon | chromium |
|---------|--------|------|--------|----------|
| 2.5 | 0.12 | 0.08 | 0.05 | 0.02 |
| Hafnium | lead | silicon | tungsten | tantalum |
| 0.01 | 0.013 | 0.012 | 0.0.10 | 0.02 | along with small amounts of hydrogen and nitrogen (25 ppm max).

The alloys used in the invention are substantially tin-free, tin being present only as an unavoidable impurity and in a maximum content of 0.02%.

The above analysis is given solely by way of example, it being possible to vary the small amounts of certain of the elements as a function of the way the alloy is produced and the state and composition of the starting products used to obtain the alloy.

Figure 2:
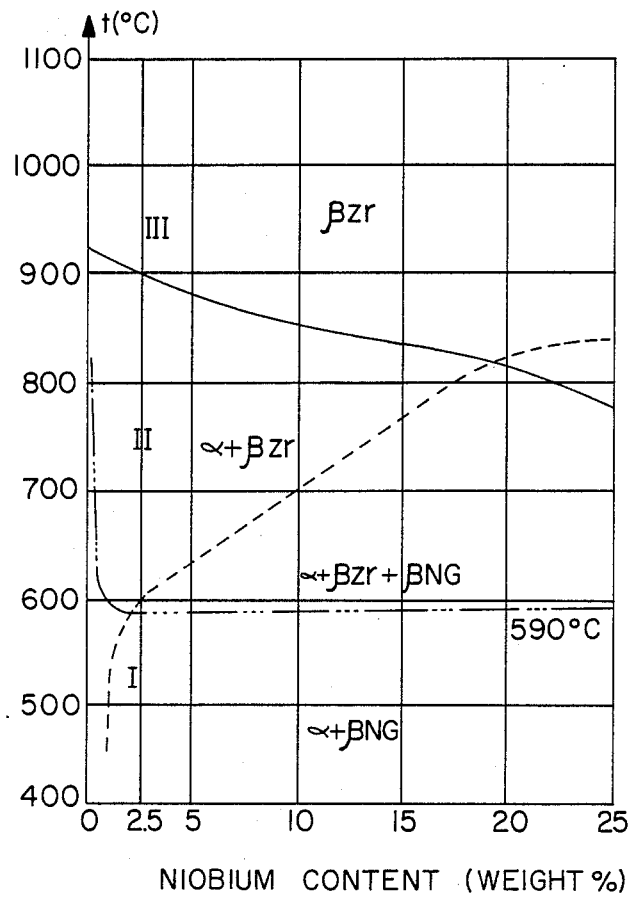
FIG. 2 is a zirconium-nionium equilibrium diagram showing the principal phases of a zirconium alloy used in the manufacture of a cross-bracing grid such as the one illustrated in FIG. 1.

FIG. 2 shows part of the zirconium-niobium thermal equilibrium diagram above 400° C. and for low niobium contents.

The principal phases of the alloy which are shown in this diagram are, first of all, the zirconium-rich phases of α and β Zr.

The α Zr phase, which is the stable low temperature phase, has a hexagonal close-packed structure, while the β Zr phase, which is the stable high temperature phase, has a body-centered cubic structure.

Also shown in FIG. 2 is the β Nb phase which is a niobium rich phase (about 90% of niobium) with a body centered cubic structure.

For an alloy containing 2.5% of niobium, such as mentioned above, three successive regions I, II and III can be distinguished.

Above 400° C. and up to about 390° C., region I is a two-phase α+β-Nb field consisting principally, in this zone, of an α phase rich in zirconium and a small amount of β phase which is rich in niobium with a body centered cubic structure.

Region II is also a two-phase region where the alloy consists principally of a hexagonal close packed phase which is rich in zirconium and a body centered cubic phase which is rich in zirconium. Region II extends approximately from 600° to 900° C.

Region III above 900° C. corresponds to the body centered cubic zirconium-rich β phase.

To carry out the process in accordance with the invention, the cold-rolled zirconium-niobium starting alloy is taken to a temperature which corresponds to the region II in which the alloy is in the two-phase α+βZr form. The strip of ribbon is then cooled from this temperature which, for example, can lie between 600° and 900° C. More precisely, the starting temperature should, in all cases, lie between 610° and 930° C. to obtain the desired structure.

Generally, a temperature close to the upper limit of region II will be preferred, and a holding time at this temperature will be chosen which is sufficient to obtain complete homogenization of the alloys (for example 20 mm at 875° C.).

The ribbon is then cooled at a regulated and moderate rate to ambient temperature, for example, 20° C.

As a result, the alloy consists of a transformed β Zr phase, metastable and of acicular structure containing grains of α phase with an equiaxed structure.

The niobium is in supersaturated solid solution in the β Zr phase.

The niobium content in the α phase and in the Zr phase, and the proportions of the β Zr phase in respect with the α phase, depend on the holding temperature before cooling and on the cooling rate.

The adjustment of these parameters makes it possible to obtain:

a good capacity of forming as far as a relative isotropy on the semi-finished product (sheet metal) a, the properties in the final state of the finished product (grid) thanks to the supplemented effect of the aging.

Excessive cooling rates will be avoided; for example, water-quench is not suitable. The cooling rate will always be lower than 110° C./sec. and in certain cases may be significantly lower, for example lower than 50° C./sec.

Excellent properties have been obtained with a cooling rate of 15° C./sec.

The plates 2 and 2' are cut and cold-formed with the ribbon in the $\alpha+\beta$ Zr state. In particular, the supporting bosses 3 for the fuel rods are formed by cutting and embossing the plates 2. Local cold work-hardening occurs at the level of the said bosses.

Next, the grid is assembled to obtain a structure such as that shown in FIG. 1, for example. The plates 2 and 2' are joined together either by welding or brazing, the said welding or brazing operation causing the metal to be carried locally to a temperature corresponding to region III of the equilibrium diagram, where the alloy is in the $\beta$ Zr form.

The assembled and welded grids are next heated, as a unit, to a temperature between 400° and 350° C. in a heat treatment furnace. The grids are held in the furnace for ten to thirty hours at an aging temperature in the $\alpha$ phase.

This $\alpha$ phase treatment gives rise to the formation of $\beta$ Nb precipitates by decomposition of the metastable $\beta$ Zr phase: $\beta$ Zr$\rightarrow\beta$ Nb+$\alpha$.

The combined conditions of the treatment of the alloy in the form of sheets and in the form of the grid allow the niobium content in the $\alpha$ phase to be decreased. This microstructure endows the cross-bracing grid with good resistance to generalized corrosion, allowing it to be used in a PWR environment. On the other hand, the alloy retains satisfactory isotropy, which ensures that the cross-bracing grid will behave well in the nuclear reactor during operation.

Aging can also supplement additional hardening of the material which enhances the mechanical strength of the grid. This hardening will be more strongly marked in the welded zones, thus increasing the resistance to lateral deformation of the lattice of plates.

On the other hand, the final aging treatment in the $\alpha$ phase makes it possible to effect the stress-relief of the welds in such a way as to ensure acceptable behavior during operation. As indicated above, the welds have a $\beta$ Zr structure prior to aging.

The cold-worked zones and, in particular, the zones of the plates which were embossed to produce the bosses, display, after aging, characteristics which are higher than those of the base material of the plates, which has not been subjected to cold-working.

As a result, the zones which correspond to the bosses will be stiffer tha the undeformed parts of the plates. This will improve effectiveness in holding the fuel rods in place.

The isotropy of the material is decreased in the cold-worked zones, with the result that dimensional stability is likely to be poorer in these zones.

In the case of the bosses, greater local growth could compensate part of the relaxation which is always high in the case of zirconium base alloy.

The process of the invention thus has the advantage of making it possible to form the plates, the zirconium alloy being in a first metallurgical state in which its formability is satisfactory, and to obtain, by a second heat treatment, on the assembled grids:

improved resistance to generalized corrosion, resistance to hydrogenization superior to that of zircaloy 4, mechanical strength which is slightly higher in the metal and markedly higher in the welds, compared to that of zircaloy 4 grids, growth under irradiation which is very moderate (good isotropy), increased local stiffness of the bosses which maintains the rods.

On the other hand, the composition and the manufacturing range of the alloy are likewise adjusted to obtain satisfactory behavior and in particular, good resistance to oxidation and to hydrogenization under the conditions of use which exist within the core of the reactor.

In addition to the elements mentioned above, small but predetermined amounts of copper and/or vanadium can be added.

Mention must be made of the fact that the niobium and oxygen present in the alloy have a large influence on the heat treatment temperatures.

In general, niobium has a tendency to increase the stability of the $\beta$ phase, and oxygen very greatly increases the temperature of the $\alpha/\alpha+\beta$ transition. For this reason the transition temperature is located close to 615° C. for low oxygen contents (close to 0.09%), but is above 750° C. for an oxygen content of 0.18%.

The inventive process could be adapted to the manufacture of any fuel assembly cross-linking grids whatever the form of the cells, the arrangement of the bosses, or the way in which bosses and springs act conjointly, the said springs generally being made of a nickel alloy and attached to the plates which constitute the walls of the cells of the grid.

What is claimed:

1. A process for manufacturing a cross-bracing grid for a fuel assembly of a pressurized water nuclear reactor, said process comprising the steps of
   (a) heating a flat product made of a zirconium base alloy which contains 2 to 3% of niobium and which is tin-free at a temperature at which the zirconium alloy is in the $\alpha+\beta$ form;
   (b) cooling the flat product at a regulated and moderate rate from the temperature at which the zirconium alloy is in the $\alpha+\beta$ form;
   (c) cutting and cold-forming the cooled flat product to form plates of the cross-bracing grid;
   (d) assembling the plates to form a lattice of the grid; and
   (e) subjecting the grid, as a whole, to aging in the $\alpha$ phase at a temperature between 500° and 550° C. for a period of ten to thirty hours.

2. Process according to claim 1, wherein the zirconium alloy contains 2.35 to 2.75% of niobium and 0.09 to 0.13% of oxygen.

3. Process according to claim 2, wherein the zirconium alloy contains 2.5% of niobium and 0.12% of oxygen.

4. Process according to claim 1, wherein the zirconium alloy contains iron, chromium and molybdenum.

5. Process according to claim 1, wherein the zirconium alloy additionally contain copper and/or vanadium.

6. Process according to claim 1, wherein the flat product is cooled at a regulated rate from a temperature between 610° and 930° C.

7. Process according to claim 1, wherein the flat product is cooled at a rate lower than 110° C./sec.

8. Process according to claim 7, wherein the flat product is cooled at a rate lower than 50° C./sec.

* * * * *